United States Patent [19]

Mogavero et al.

[11] 4,067,015

[45] Jan. 3, 1978

[54] SYSTEM AND METHOD FOR TRACKING A SIGNAL SOURCE

[75] Inventors: Louis N. Mogavero, Alexandria, Va.; Edwin G. Johnson, Kensington, Md.; John M. Evans, Jr, Gaithersburg, Md.; James S. Albus, College Park, Md.

[73] Assignee: The United States of America as represented by the National Aeronautics and Space Administration, Washington, D.C.

[21] Appl. No.: 595,254

[22] Filed: July 11, 1975

[51] Int. Cl.² .............................................. H04B 7/08
[52] U.S. Cl. .................................... 343/225; 325/66; 325/118; 343/112 R; 362/269
[58] Field of Search ............. 343/225, 112 PT, 112 R, 343/108 M, 100 AD, 7.4, 100 ST, 117; 340/24, 224; 325/66, 37, 310, 314, 118, 29, 111, 113, 119; 250/203 R; 240/41.6, 41.61

[56] References Cited

U.S. PATENT DOCUMENTS

| | | | |
|---|---|---|---|
| 1,219,682 | 3/1917 | Vansize | 325/118 |
| 3,514,608 | 5/1970 | Whetter | 250/203 R |
| 3,646,580 | 2/1972 | Fuller et al. | 340/24 |
| 3,685,053 | 8/1972 | Kirkpatrick | 343/112 PT |
| 3,696,248 | 10/1972 | Cunningham et al. | 250/203 R |
| 3,783,263 | 1/1974 | Cruse | 240/3 |
| 3,790,948 | 2/1974 | Ratkovich | 325/118 |
| 3,886,555 | 5/1975 | Royal | 343/117 R |

*Primary Examiner*—John W. Caldwell, Sr.
*Assistant Examiner*—James J. Groody
*Attorney, Agent, or Firm*—Nina M. Lawrence; John R. Manning

[57] ABSTRACT

A system for tracking moving signal sources is disclosed which is particularly adaptable for use in tracking stage performers, although a wide range of other uses is possible. A miniature transmitter is attached to the person or object to be tracked and emits a detectable signal of a predetermined frequency. A plurality of detectors positioned in a preset pattern sense the signal and supply output information to a phase detector which applies signals representing the angular orientation of the transmitter to a computer. The computer provides command signals to a servo network which drives a device such as a motor driven mirror reflecting the beam of a spotlight, to track the moving transmitter.

4 Claims, 2 Drawing Figures

SYSTEM AND METHOD FOR TRACKING A SIGNAL SOURCE

ORIGIN OF THE INVENTION

The invention described herein was made by employees of the United States Government and may be manufactured and used by or for the Government of the United States of America for governmental purposes without the payment of any royalties thereon or therefor.

BACKGROUND OF THE INVENTION

1. Field of the Invention

This invention relates generally to systems for tracking signal sources and more particularly to a system for tracking one or more signal sources and for pointing a device toward the signal sources being tracked.

2. Description of the Prior Art:

Many circumstances exist in which it is desirable to track a moving object or person and to follow the moving object or person with a camera, spotlight, microphone or other similar device. For example, in live stage performances particularly of operas and ballets, it is common practice to follow the star performers or soloists with individual spotlights.

Following performers with spotlights night after night as they repeat the same performance can become a tedious job and is considered by many to be somewhat undesirable. As a result, controlling spotlights to track performing artists has traditionally been assigned to semi-skilled workers or super-annuated members of the theatrical electricians crew. This has frequently resulted in faulty spotlight control due to lack of interest, impaired physical abilities, fatique, illness and other human frailties. Naturally, poor spotlight control can be very distracting to an audience and may result in an otherwise flawless performance receiving unfavorable reviews.

A need therefore exists for an automated system whereby performing artists can be automatically tracked with spotlights.

Many analogous situations exist wherein it is necessary to follow a moving performer or object with a spotlight or equivalent apparatus such as in television coverage of theatrical and sporting events. For example, in televising or videotaping theatrical performances, it may be desirable to have one or more isolated cameras follow individual soloists or performers to record in detail all aspects of their performances. Similarly, in sporting events it is often desirable to have one or more television cameras following the ball or individual star players. In such instances it would be useful to have a system for permitting the cameras to automatically track the desired object or individuals to eliminate the need for one or more television camera men. In this regard it it pointed out that camera men are highly skilled, rather than semi-skilled, and thus often command rather high salaries. Accordingly elimination of some individual cameramen and other sophisticated technicians would tend to reduce the cost of televising certain types of events.

A need for a system for tracking individuals also exists in the field of security where it is desirable to use television or photographic equipment to automatically track and record the movements of a watchman or security guard. Many other similar circumstances exist wherein there is a need for a system which automatically tracks individuals or objects.

SUMMARY OF THE INVENTION

Accordingly, one object of this invention is to provide a novel system for tracking individuals or objects.

Yet another object of the present invention is the provision of a novel system for tracking a signal source carried by an individual or mounted within an object.

A still further object of the present invention is the provision of a system for maintaining spotlights trained on moving performers.

Yet another object of the present invention is the provision of a novel system for enabling television cameras, spotlights and other types of devices to automatically track moving individuals or objects equipped with suitable signal sources.

A still further object of the present invention is the provision of a novel system for tracking the movement of an individual or object equipped with a radio signal transmitter.

A still further object of the present invention is the provision of a novel method of tracking individuals or objects.

Briefly, these and other objects of the invention are achieved by providing each individual or object to be tracked with a radio or acoustic wave transmitter. A plurality of signal receivers are spaced in a known geometry to receive the signals generated by the various transmitters. The changing positions of the transmitters are sensed using standard interferometric signal processing procedures on the output signals of the receivers. Servo equipment controlled by these output signals is used to direct a spotlight beam or equivalent apparatus at the moving individual or object.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
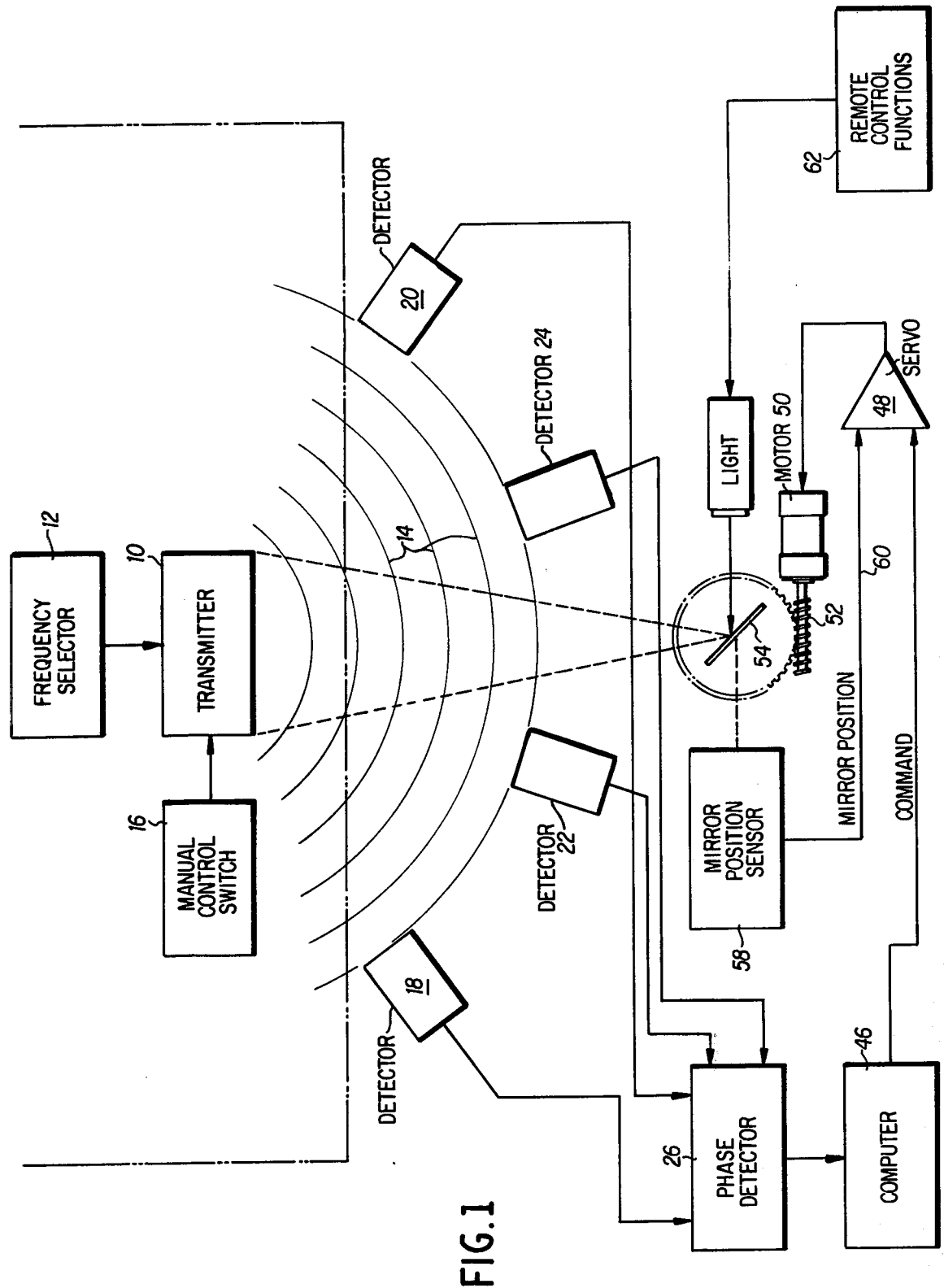
FIG. 1 is a block diagram of one embodiment of the system of the present invention.

Referring now to the drawings, wherein like reference numerals designate identical or corresponding parts throughout the several views, and more particularly to FIG. 1, thereof, one embodiment of the system of the present invention is illustrated in the form of a block diagram. A transmitter 10 having an optional frequency selector 12 coupled thereto is shown transmitting a series of spherical or omnidirectional waves 14. The transmitter 10 is shown equipped with a manual control switch 16 for switching the transmitter output on and off.

Although the transmitter 10 may be an ultrasonic acoustic transmitter, it is preferably a miniature ratio transmitter which simply transmits a single frequency constant amplitude signal. The frequency selector 12 is optional as the transmitter 10 must be capable of transmitting only one frequency signal. However, it may be desirable to have multiple crystals or multiple frequency selectors so that an individual transmitter can be adjusted to transmit different fixed frequencies. A need for a plurality of transmitters each transmitting a different frequency signal occurs in circumstances where more than one individual performer or object is to be tracked. For example, in a ballet performance it may be desirable to follow several performers with individual spotlights. In this case, each performer would be equipped with a transmitter 10, the only difference among the transmitters being that each would transmit at a different frequency to permit independent tracking of the multiple performers.

The transmitter 10 may be a VHF or UHF device and must be a miniature, continuous wave, battery powered device of at least 10 milliwatt power output with a 1 in $10^4$ frequency stability, and preferably capable of frequency adjustment as described above. Numerous conventional miniaturized transmitters of this type are known and have been disclosed in patents and other publications. Since the individual circuitry of the transmitter is irrelevant to the present invention, those skilled in the art can easily select appropriate conventional transmitters fulfilling the above mentioned specifications on the basis of economic factors, availability and other conventional factors.

Miniature ultrasonic transmitters can also be used, as described above, and selection of suitable conventional transmitters would follow the same guidelines as for the ratio transmitters described above. However rapid attenuation of ultrasonic signals along with reflections and standing wave patterns caused by the reflection of sonic signals from floors and other structures could create difficulties with ultrasonic systems. Thus, in many indoor environments radio frequency systems would be the most trouble free and convenient systems to operate.

Tracking of the moving transmitters is accomplished by phase difference detection according to the present invention. Phase difference tracking of radio or acoustic wave transmitters is based on the fact that such transmitters produce spherical waves of frequency w in the surrounding space. These waves are then detected by several sensors spaced in a known geometry, and changes in the position of a particular transmitter with respect to the sensors is detectable as a change in the phase of the radiated wave. By detecting the relative phase between two or more detectors at any instant, the position of the emitter can be detected using standard interferometric procedures.

The appropriate detector network is illustrated in block diagram form in FIG. 1. In particular, a plurality of detectors 18, 20, 22 and 24 are illustrated positioned across an area which is understood to comprise the normal area to which movement of the transmitter 10 is confined. In the case of a stage, for example, the detectors 18 through 24 may be positioned at regular intervals across the width of the stage located at a convenient height, such as the floor level of the stage or at the ceiling of the theather or auditorium. Alternatively the detectors may be positioned to surround the area of transmitter movement. In the case of a stage, for example, the detectors may be positioned in front, above and behind the performing area. In general, positioning of the detectors may be appropriately selected to provide the best coverage for the particular individuals or objects to be tracked. The spacing of the detectors determines the number of interference fringes appearing across the region of interest, and the location of the detectors relative to the source determines the error in position measurement.

Generally two detectors are required for each degree of freedom of the individuals or objects being tracked, although it is possible to track motion in a plane using only three detectors provided the detectors are properly positioned around the area in which movement is to be tracked. To track three dimensional motion, one pair of detectors must be mounted perpendicular to the plane of the planar motion detectors. In the drawing the detectors 18 and 20 are drawn in solid lines while the detectors 22 and 24 are drawn in broken lines. This has been done to indicate that the system will operate with a minimum of two detectors (i.e. 18 and 20) for sensing linear position although additional detectors, such as detectors 22 and 24, are required to track planar motion in the illustrated embodiment of the invention.

If radio transmitters are used, the detectors may simply be conventional ratio antennas equipped with one or more stages of amplification where required. If ultrasonic transmitters are used, the detectors are conventional transducers such as microphones, also equipped with required stages of amplification. In both cases conventional equipment is available to perform the necessary signal detecting functions.

If radio frequency components are used, the transmitter frequencies are preferably selected in the range around 100MHz, which is in the commercial FM radio broadcast band. In this case the detectors 18 through 24 may be conventional high gain, low noise FM antennas with amplifiers.

Figure 2:
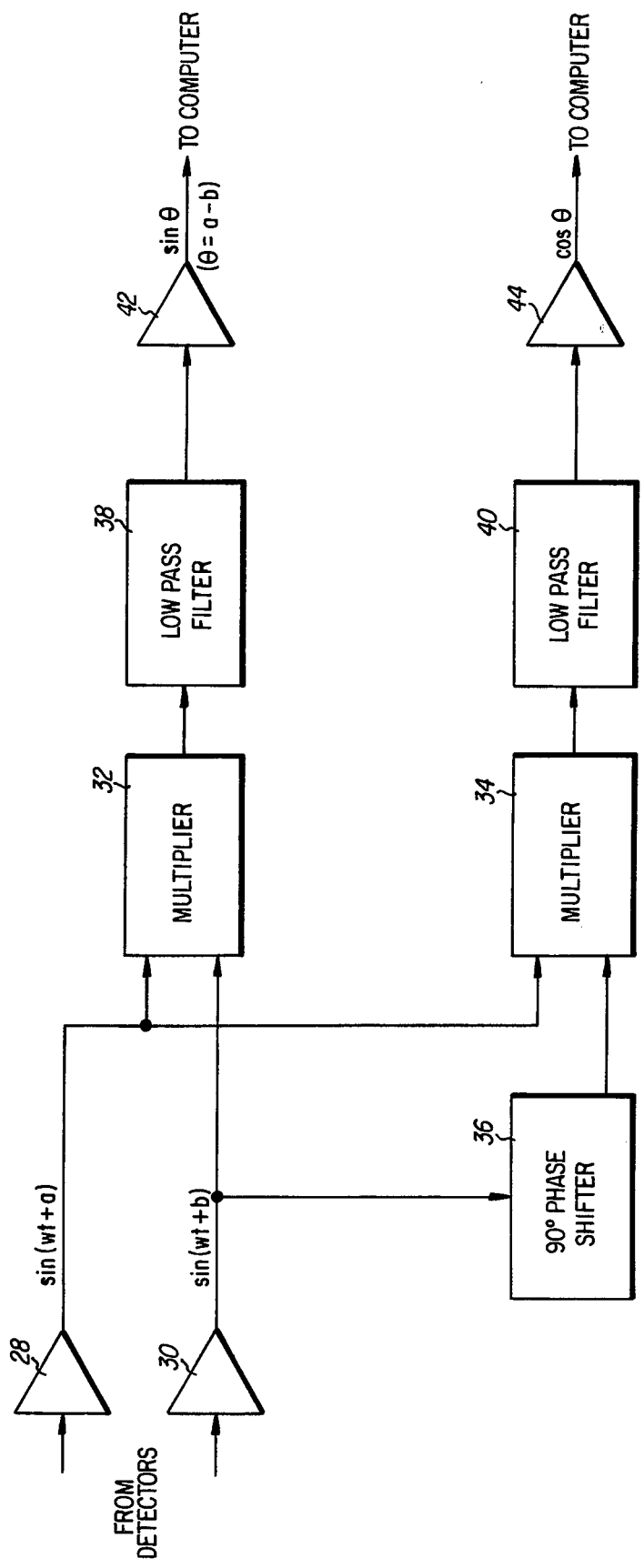
FIG. 2 is a detailed block diagram of the phase detector network used in the embodiment of the invention illustrated in FIG. 1.

The received signals sensed by the detectors are applied to a phase detector 26 which senses the phase difference between signals detected by individual detectors 18 through 24. The details of the phase detector 26 are illustrated in FIG. 2. For ease in understanding the present invention, the illustration in FIG. 2 has been simplified by the assumption that only two of the detectors 18 and 20 are coupled to the system, and that motion in only one direction is to be tracked. It will be apparent to those skilled in the art that motion in a plane and motion in space can be tracked according to the same principles with additional detectors and slightly more complicated mathematics, Referring now to FIG. 2, the signals from the detectors 18 and 20 are applied first to amplifiers 28 and 30. The received signals have the following form:

$$U_1 = \sin(wt + a) \qquad U_2 = \sin(wt + b)$$

where $a$ and $b$ are the phases of the received signals relative to the transmitter, and are related to the relative positions of the receivers and the transmitter. The phase detector includes two channels, in one of which the two received signals are multiplied together, and in the other of which one of the received signals multiplied by the other signal after phase shifting through 90°.

Referring again to FIG. 2, two multipliers or mixers 32 and 34 are shown. The first conventional multiplier 32 receives input from both of the amplifiers 28 and 30, while the second conventional multiplier 34 receives one input from the amplifier 28 and a second input from a conventional 90° phase shifter 36. Although multipliers are illustrated in the figures, these devices may be replaced by conventional dual matched mixers which are commercially available at lower cost than the illustrated multipliers.

The outputs of the multipliers 32 and 34 are applied to first and second low pass filters 38 and 40, and then to first and second output amplifiers 42 and 44.

In the first multiplier 32, the two input signals $U_1$ and $U_2$ defined above are multiplied together to produce the following product:

$$U_3 = \sin(wt + a) \sin(wt + b)$$
$$= \tfrac{1}{2}[\cos(a-b) - \cos(2wt + a + b)]$$

The signal applied to the second multiplier 34 consists of the output of amplifier 28 plus the output of amplifier 30 shifted by 90°. The resultant product of these two inputs is as follows:

$$U_4 = \sin(wt + a) \cos(wt + b)$$
$$= \tfrac{1}{2}[\sin(a - b) + \sin(2wt + a + b)]$$

The outputs $U_3$ and $U_4$ of the multipliers 32 and 34 are applied to the low pass filters 38 and 40 where the terms including 2 wt are removed, leaving only $\cos \theta$ and $\sin \theta$, where $\theta = a - b$. The angle $\theta$ is the phase difference between the received channels, as is well known to those skilled in the art. The resultant output signals from the phase shifter, $\sin \theta$ and $\cos \theta$, contain all of the necessary information to track a transmitter in linear motion. As mentioned previously, additional information supplied through additional detectors may be used to track transmitters in planar and three dimensional motion.

The particular circuitry required for the phase detector illustrated in FIG. 2 is not novel in itself, and does not constitute an aspect of the present invention. All of the components required to produce the illustrated phase detector are conventional and are commercially available.

If ultrasonic transmitters are used, as described previously, a phase detector of the type illustrated in FIG. 2 may be utilized, although it will be understood that the acoustic signals may be converted into electronic signals for processing. In addition, a phase difference detector which is particularly suitable for use with acoustic signals is disclosed in U.S. Pat. No. 3,854,117 to Fothergill.

Referring again to FIG. 1, the outputs of the phase detector 26 are fed to a computer 46 which performs necessary positional calculations. In the simplified example discussed above, the computer, which includes appropriate analogue-to-digital and digital-to-analogue converters, calculates first the relative phase shift $\theta$ and then the position of the transmitter along the stage. The theoritical lines of constant phase difference with respect to the receivers are hyperbolic with loci at the detectors. These functions can be calculated analytically but it is easier to combine the conversion from relative phase shift to positional information with a calibration procedure to account for multi-path reflections and near field effects which will distort the theoretical interference patterns. By storing observed values of $\theta$ as a function of the position of the transmitter in the computer, a conversion from $\theta$ to the value corresponding to the position of the transmitter while tracking may be made by simply looking up numbers in a table in a computer memory. This technique allows the use of a very small computer or microprocessor.

A coordinate transformation must be performed in the computer from positional information to $\phi$, the angular direction in which a spotlight, for example, must be pointed. The angle $\phi$ is an arctangent function of the position of the transmitter, which again may be calculated by the above-described technique of looking up values stored in the computer memory. Both transformations may be combined into one table of numbers in the computer's memory.

The computer 46 may be any commercially available small computer. It will clear to those skilled in the art that the computer is not limited to a small general purpose computer, but a suitable microprocessor may be constructed for use with the system to reduce system costs upon large scale production and distribution.

The computer output, which is in effect a positional command signal, is supplied to a conventional servo amplifier network 48.

The servo network 48 is coupled to a servo motor 50 which is coupled through worm gear 52, or other suitable mechanical coupling apparatus, to a rotatable mirror 54. A conventional spotlight 56 projects its beam on the mirror for reflection toward the position occupied by the transmitter 10, and accordingly tracks the individual or object to which the transmitter is attached. Although the illustrated motor and worm gear assembly permits the mirror 54 to rotate about only one axis to illustrate the basic principles of the present invention, it will be understood by those skilled in the art that the invention contemplates the use of conventional equipment for permitting mirror tilt also, whereby planar and three dimensional motion may be tracked.

A mirror position sensor 58 is coupled to the rotatable mirror 54 for sensing the angular position thereof, and supplies an output signal over a line 60 to the servo network for indicating the position of the mirror. The servo network 48 develops an error signal representing the difference between the mirror position signal and the command signal from computer 46 and this error signal is used to drive the motor 50 for positioning the mirror 54. The mirror driving system for covering a conventional stage performance should permit pan deflection of 40°, assuming the spotlight covers a 72 foot stage from a range of 100 feet, and should permit tilt deflection of 20°. Focusing servos may be required depending upon the optics of the system. A pointing accuracy of 3 minutes of arc with a sluing speed of 13°/second are also adequate allowing 3 seconds for full scale deflection across a stage. Naturally, for environments other than conventional stages, or for stages of larger dimensions, systems of different performance capabilities should be used.

It is noted that the servo system could directly drive the spotlight but to do so a large, powerful and consequently noisy servo system would be required. Accordingly, the mirror deflection system previously described is considered to be a superior approach to the problem of rapidly deflecting the spotlight beam.

The above-described system control the pan and tilt motions of the spotlight beam only. Other functions such as spot size and color must also be changed from time to time to provide desired effects. Accordingly, a remote control system 62 is provided for permitting a light technician to control the spot size, beam color or any other parameters from a convenient location backstage or elsewhere. Various types of remote control systems can be used for providing the required remote control function. For example a remote control lighting system of a type similar to the system disclosed in U.S. Pat. No. 3,783,263 to Cruse may be conveniently employed, particularly where a pneumatically driven system is desirable.

Control of the on and off switching of spot lights is handled by individual performers as they enter or exit from the stage simply by controlling the manual switch 16 coupled to each transmitter 10. It is desirable to store the point of initial stage entry in the computer or to employ a course-fine system (mentioned subsequently) to insure that the lights point to the position of a performer's first entry onto the stage. Normally, each performer switches on his transmitter just before entering the stage so that the spotlight dedicated to him is turned on and automatically pointed to the area on the stage where he will enter. In this regard, it is noted that the radio waves of the transmitters penetrate curtains and the like so that the spotlights will be accurately pointed at the position of the performer even though he has not yet entered the stage and is behind the side curtain. Where objects such as balls, hockey pucks, and the like are to be followed, the transmitters can be left on continuously and control of the tracking unit, whether it be a spotlight or television camera, can be left to a technician or director who can manually switch the camera or spotlight on and off at appropriate intervals.

In a conventional theater it is anticipated that four automated spotlights will be sufficient to provide coverage for the soloists and star performers in most ballets and similar performances. It is preferred that the automated spotlights defuse rather than focus sharply in order to avoid sharp edge effects. In this case tracking accuracy can be limited to about 5 inches so that the center of the tracking light can be as much as 5 inches away from the signal transmitter being tracked without producing any undesirable lighting effects. The spotlight actuators must be capable of matching the maximum acceleration of the transmitter being tracked, which in the case of performers is 32 feet/sec$^2$, the acceleration of gravity. A somewhat faster response time will be required where fast moving balls or other objects are to be tracked. The servo systems must also include a suitable deadband to avoid continuous slight motions of the tracking system in response to small movements of performers.

The system of the present invention can be provided with a further degree of sophistication by providing coarse and fine locating circuitry to enhance the speed and accuracy of the tracking network, particularly in locating performers as they enter the stage. Such a system is easily implemented by providing an extra detector or antenna at a distance of one half wavelength of the transmitted frequency or less in distance from one of the other detectors for each degree of freedom of tracking motion. With this detector spacing, one interference fringe exists across the entire stage.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A system for monitoring the movements of a performer over the area over which the performer is to move and for tracking the movements with a light beam produced by a spotlight, said system comprising:

at least one movable miniaturized transmitting means, adapted to be carried by a performer, for transmitting an omnidirectional signal capable of being tracked;

at least first and second detector means for sensing said omnidirectional signal and for respectively producing first and second output signals in response thereto, said detector means being remotely spaced from one another at different locations relative to the area over which the performer is to move and being positioned in a predetermined, fixed pattern with respect to the area over which the performer is to move;

phase detector means coupled to detector means for receiving said output signals and for producing an output in accordance with the phase difference between the output signals produced by said first and second detector means, said phase detector means comprising a first channel for receiving said first output signal and including a first multiplying means for multiplying the first and second output signals, and a low pass filter, and a second channel for receiving said second output signal and including a phase shifter, a second multiplying means for multiplying the first signal and the output signal from the phase shifter, and a second low pass filter;

command position signal generating means coupled to said phase detector means for receiving said output from said phase detector and for generating a position command signal in accordance therewith;

servo motor means;

servo network means coupled to said command position signal generating means for receiving said command signal and for controlling said servo motor means in accordance therewith;

movable tracking means coupled to and driven by said servo motor means in response to said command signal for tracking the transmitting means carried by the performer, said tracking means comprising a fixed spotlight for producing a light beam and a rotatable mirror for reflecting said beam so as to track said transmitting means, said rotatable mirror being controlled by said servo motor and positioned to receive said light beam produced by said spotlight; and mirror position detector means coupled to said rotatable mirror and to said servo network means for providing tracking error signals to said servo network means so as to control the tracking movement of said mirror.

2. A system for tracking a signal source as in claim 1, wherein:

said transmitting means comprises a radio frequency transmitter.

3. A system for tracking a signal source as in claim 2, wherein:

said transmitting means includes a manual control switch whereby said transmitting means may be manually switched on and off.

4. A system for tracking a signal source as in claim 1, further comprising:

a remote control system coupled to said tracking means for controlling predetermined functions of spot size and color of said tracking means.

* * * * *